United States Patent
Luik et al.

(10) Patent No.: US 7,229,124 B2
(45) Date of Patent: Jun. 12, 2007

(54) MOTOR VEHICLE HAVING AN ENERGY-ABSORBING DEFORMATION ELEMENT

(75) Inventors: Klaus Luik, Muehlacker (DE); Werner Maier, Leonberg (DE); Matthias Zierle, Filderstadt (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 48 days.

(21) Appl. No.: 11/138,209

(22) Filed: May 27, 2005

(65) Prior Publication Data

US 2006/0012220 A1 Jan. 19, 2006

(30) Foreign Application Priority Data

May 28, 2004 (DE) .............. 10 2004 026 200

(51) Int. Cl.
*B60R 13/02* (2006.01)
(52) U.S. Cl. .................. 296/187.05; 296/187.09; 296/39.1; 280/748
(58) Field of Classification Search ........... 296/187.09, 296/187.05, 39.1; 280/748, 751
See application file for complete search history.

(56) References Cited

U.S. PATENT DOCUMENTS

| | | | | |
|---|---|---|---|---|
| 3,779,595 A | * | 12/1973 | Suzuki et al. ........... | 296/187.05 |
| 5,163,730 A | * | 11/1992 | Welch .................... | 296/187.05 |
| 5,531,499 A | * | 7/1996 | Vecchio et al. .......... | 296/146.7 |
| 5,660,426 A | * | 8/1997 | Sugimori et al. ........ | 296/187.05 |
| 5,791,716 A | * | 8/1998 | Takagi et al. ............. | 296/39.1 |
| 5,833,303 A | * | 11/1998 | Kawai et al. ........... | 296/187.05 |
| 6,340,200 B1 | * | 1/2002 | Enomoto et al. ....... | 296/187.09 |
| 6,394,536 B2 | * | 5/2002 | Takahara ............... | 296/187.05 |
| 6,779,835 B2 | * | 8/2004 | Fox et al. .............. | 296/187.05 |
| 6,979,052 B2 | * | 12/2005 | Hess et al. ............. | 296/187.05 |
| 2001/0019214 A1 | | 9/2001 | Takahara | |
| 2003/0107242 A1 | * | 6/2003 | Fox et al. ................... | 296/189 |

FOREIGN PATENT DOCUMENTS

| | | |
|---|---|---|
| DE | 195 01 454 A1 | 8/1995 |
| DE | 195 05 935 A1 | 8/1995 |
| DE | 101 21 688 A1 | 11/2002 |
| EP | 1 332 932 A2 | 8/2003 |
| GB | 2 338 457 A | 12/1999 |

* cited by examiner

*Primary Examiner*—Dennis H. Pedder
*Assistant Examiner*—Michael Hernandez
(74) *Attorney, Agent, or Firm*—Crowell & Moring LLP

(57) ABSTRACT

A motor vehicle includes a body shell element, an interior-covering part for the body shell element, an energy-absorbing deformation element arranged between the body shell element and the interior covering part, and a deformable supporting element connecting the interior-covering part to the body shell element. The deformation element is constructed as a sheet metal part in the shape of an elongated hollow profile, and includes at least one fastening leg and at least one deformation leg. The fastening leg is connected with the interior-covering part. The deformation leg starts out from the fastening leg and faces the body shell element. The deformation characteristics of the deformable supporting element are designed in consideration of the deformation characteristics of the deformation element. The deformation leg is arranged at a distance from the body shell element.

12 Claims, 3 Drawing Sheets

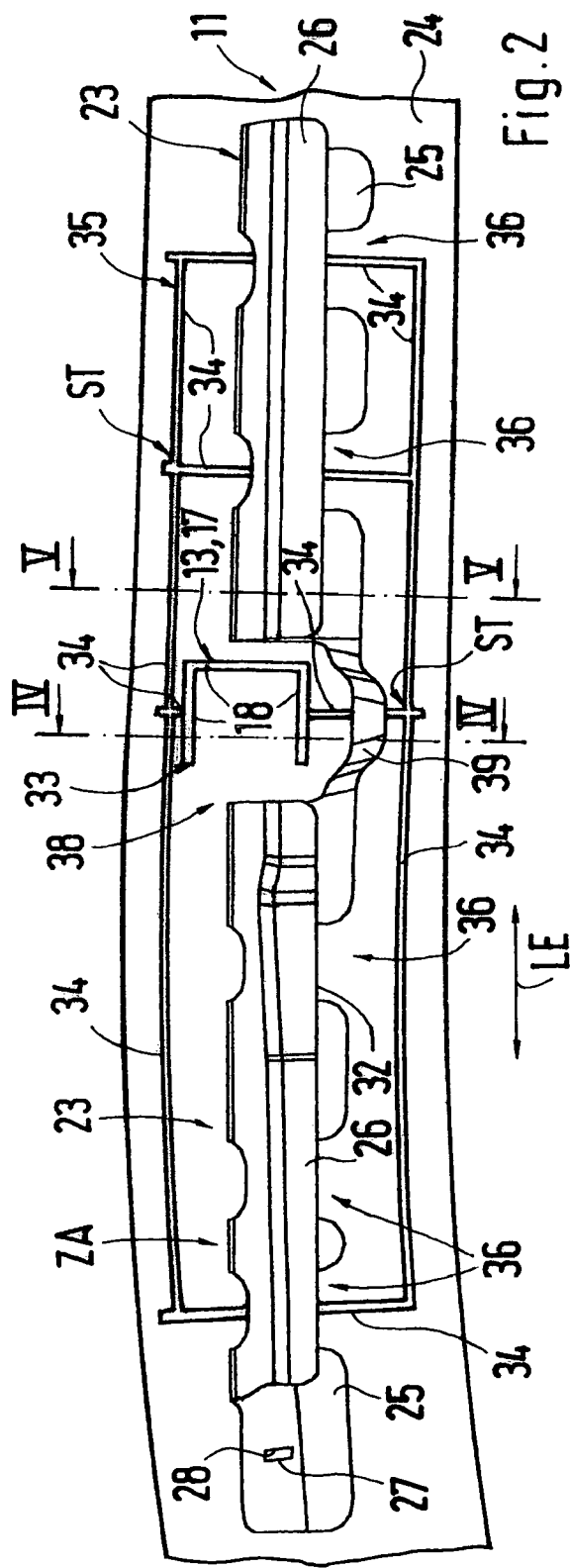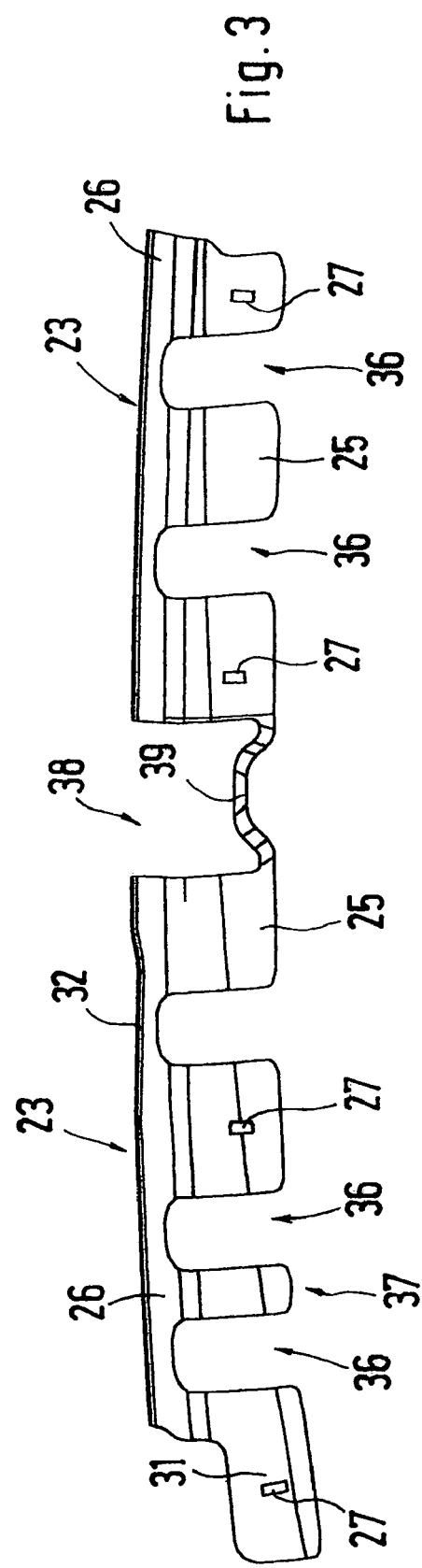

and Summary of the Invention

MOTOR VEHICLE HAVING AN ENERGY-ABSORBING DEFORMATION ELEMENT

This application claims the priority of German Patent Document No. 10 2004 026 200.4, filed May 28, 2004, the disclosure of which is expressly incorporated by reference herein.

BACKGROUND AND SUMMARY OF THE INVENTION

The invention is based on a motor vehicle having an energy-absorbing element.

A motor vehicle of the above-mentioned type, which is constructed as a passenger car, is known from U.S. Pat. No. 5,163,730. It has at least one body shell element (an A pillar here) which is covered by an interior-covering part on its interior side facing the vehicle interior. A deformation element is arranged between the body shell element and the interior-covering part. The deformation element protects a vehicle occupant from excessive load values when the occupant impacts through a body part on the interior-covering part as a result of an accident. Thus, the deformation element is to absorb energy by converting kinetic energy to deformation work or heat. The known deformation element is constructed as an elongated hollow profile and has at last one fastening leg and a deformation leg. The fastening leg is connected with the interior surface of the interior-covering part, which interior surface faces the body shell element. The deformation leg, which is supported on the body shell element, starts out from the fastening leg. Furthermore, the fastening leg is equipped with an extension leg, so that, in addition to the fastening to the interior-covering part, a holding is also established on the body shell element. It is disadvantageous that considerable mounting expenditures are required for the fastening of the deformation element on the body shell element as well as on the interior-covering part.

It is an object of the invention to have a motor vehicle which does not have this disadvantage.

This object is achieved by a motor vehicle described and claimed below.

The principal advantages achieved by the invention, in addition to a simple mounting of the interior-covering part and the deformation element on the body shell element, is the fact that, for example, a noise development between the deformation element and the body shell element can be largely avoided because the deformation leg is situated in a free-standing manner at a distance from the body shell element. In addition, with the supporting element having the deformation behavior coordinated according to the invention, the interior-covering part is fixedly held and supported on the body shell element. As a result, a secure fastening and a simple mounting can take place, and an undesirably rigid bridging of the deformation element is avoided.

According to a further development, the interior-covering part is provided with a reinforcing structure using webs.

If the webs are provided, in a further development of the invention, a plane linking of the fastening leg to the interior side of the covering part is achieved if the fastening leg has several recesses in the area of the webs, in which recesses the webs are arranged.

An embodiment is particularly preferred in which two deformation elements are arranged in series but at a mutual distance, so that the supporting element for the interior-covering part can advantageously be situated between the deformation elements.

For a simple mounting of the deformation element on the interior-covering part, both deformation elements are mutually connected by way of a connecting lug, which is arranged or extended such that it extends past the supporting element.

If the webs of the reinforcing structure are provided in the area of the connecting lug on the interior side of the interior-covering part, the connecting lug has a bent construction and thus spans the web.

For a simple fastening of the deformation element on the interior side of the interior-covering part, fastening noses are arranged on the interior side of the interior-covering part, which fastening noses reach through the corresponding fastening openings on the fastening leg. After the assembly of the deformation element and the interior-covering part, the fastening noses can be shaped be deformation, for example, by the effect of heat or welding, so that the deformed fastening nose reaches over the edge of the fastening opening and thereby holds the deformation element on the interior side of the interior-covering part.

According to a particularly preferred embodiment, the supporting element for the interior-covering part is constructed as a fastening dome whose roof is supported on the body shell element.

It was found to be particularly advantageous that the deformation behavior of the supporting element can thereby be coordinated with the deformation behavior of the deformation element if a weakening, particularly a weakening opening, is provided at least in a side wall of the fastening dome. In this case the weakening opening can be constructed such that, for example, a side wall of the fastening dome can be completely eliminated.

A simple connection between the roof of the fastening dome and the body shell element can be accomplished by inserting a holding element having a reach-behind element in the roof of the fastening dome. The reach-behind element is inserted into the body shell element.

BRIEF DESCRIPTION OF THE DRAWINGS

In the following, the invention will be explained in detail by means of embodiments with reference to the drawings.

FIG. 2 is a view of an assembled part including an interior-covering part and a deformation element.

FIG. 3 is a rotated view of the deformation element according to FIG. 2.

DETAILED DESCRIPTION OF THE DRAWINGS

Figure 1:
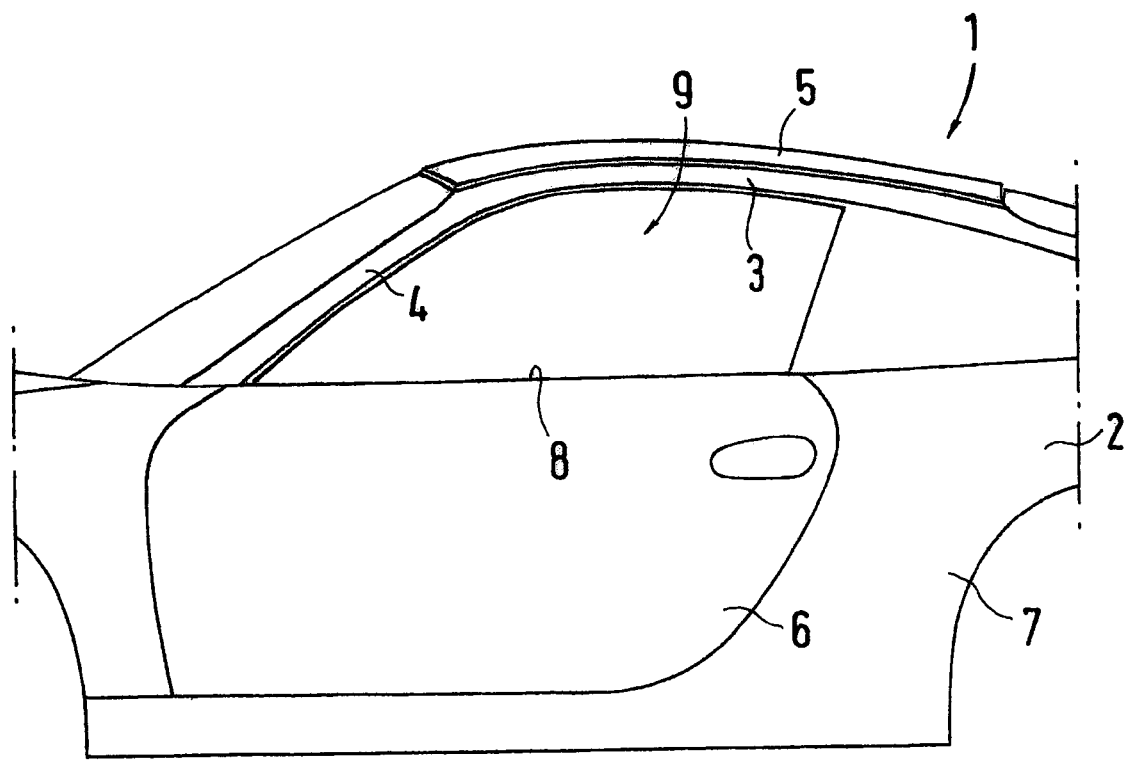
FIG. 1 is a lateral cutout of a motor vehicle with several body shell elements.

A motor vehicle 1 illustrated as a lateral cutout in FIG. 1 comprises a body shell 2 having several body shell elements 3 to 7, which are assembled to form a vehicle body or a supporting frame. Specifically, the following body shell parts 3 to 7 are shown: Body shell part 3 forms a roof member which, in a section above a belt line 8, changes into an A pillar (body shell element 4); body shell element 5 is implemented as a roof plate arranged between the roof members 3; body shell element 6 is implemented as a side door; and body shell element 7 represents a side wall of the vehicle body. Inside the body shell 2, a vehicle interior 9 is constructed which is called an occupant compartment. The body shell elements 3 to 7 are covered on their interior side 10 facing this interior 9 by interior-covering parts known per se, of which one interior-covering part 11 is visible in FIGS. 2 to 5. Between this interior side 10, which faces the interior 9, of the body shell elements 3 to 7 and the assigned interior-covering part 11, a deformation element 23 (FIGS. 2 to 5) is arranged for protecting a vehicle occupant. Such a deformation element 23 could naturally also be used on the A pillar (body shell element 4) or on another column, such as a B column or C column, or on other elongated body shell elements.

In the following, by way of the body shell part 3 (roof member), the deformation element 23 and the pertaining interior-covering part will be explained in detail using FIGS. 2 to 5. In FIGS. 2 to 5, identical parts or parts having the same effect as in FIG. 2 are provided with the same reference numbers, so that reference is made to their description.

Figure 4:
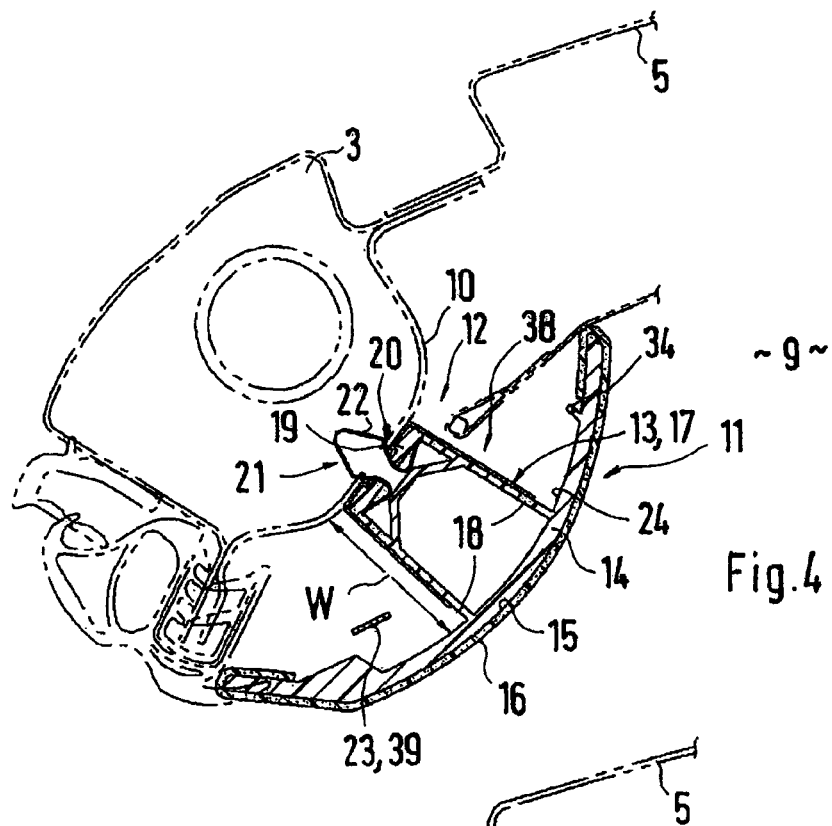
FIGS. 4 and 5 are sectional views respectively of a body shell element with a interior-covering part fastened thereto and a deformation element arranged in-between, corresponding to the intersection lines IV-IV and V-V in FIG. 2.
Figure 5:
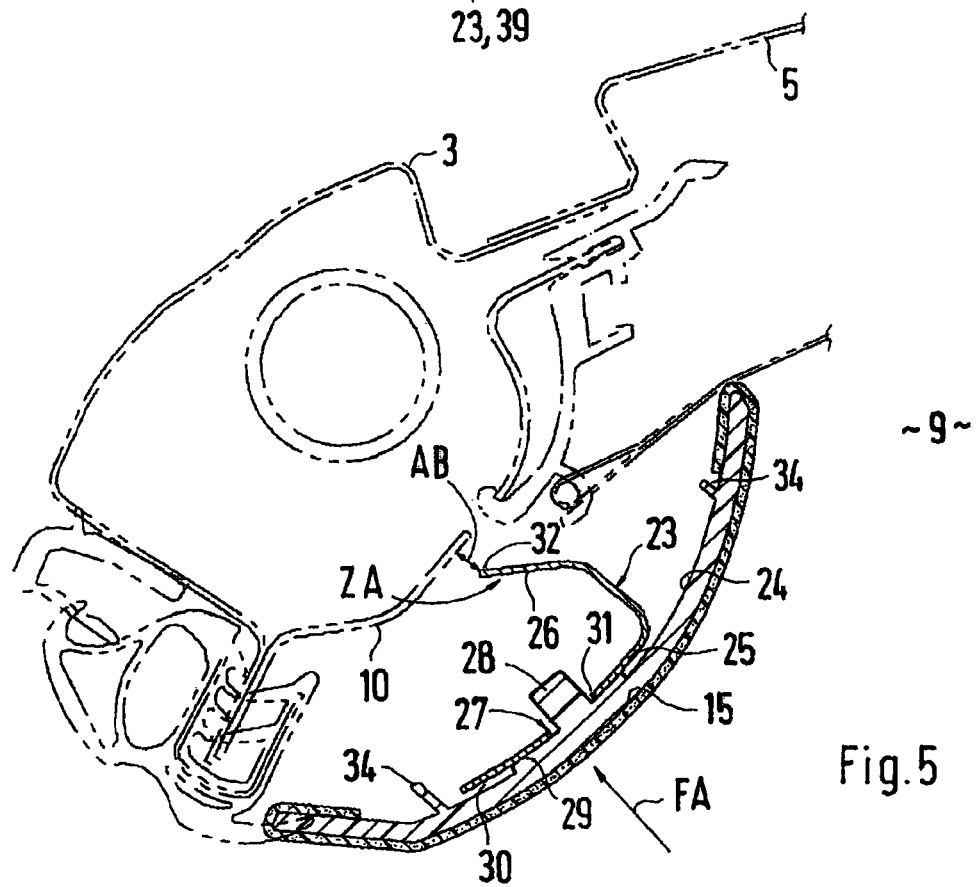

FIGS. 4 and 5 show that an intermediate space 12 exists between the interior side 10 of the body shell element 3 (the roof member here) facing the vehicle interior 9 and the interior-covering part 11 facing this interior side 10. The width W of this interior space 12 is essentially limited by a supporting element 13 acting as a spacer. This supporting element 13 is preferably constructed in one piece with a carrier part 14 of the interior-covering part 11, which carrier part 14 may be covered at least in sections on its outer surface 15 facing the vehicle interior 9 by way of a skin 16. The supporting element 13 is constructed as a fastening dome 17 which has side walls 18 projecting from the outer surface 15 and a roof 19. An opening 20 is provided in the roof 19, through which a holding element 21 reaches, which is supported inside the fastening dome 17, and is thereby inserted into the roof 19. This holding element 21 constructed, for example, as a spring clip, preferably has a reach-behind contour 22 which engages in the body shell element 3 and thereby holds the interior-covering part 11 on the body shell element 3. In this case, the roof 19 is supported on the interior side 10.

The energy-absorbing deformation element 23 is inserted in the intermediate space 12 and is fastened to the interior surface 24 of the covering part 11, which interior surface 24 faces the body shell element 3, as described in detail in the following by way of FIGS. 2, 3 and 5. The deformation element 23 is constructed as an elongated sheet metal part in the form of a hollow profile which may be open or closed and extends along the interior-covering part 11 constructed as a pillar covering and/or member covering. Furthermore, the deformation element 23 is implemented as a hollow profile having several profile legs and, accordingly, has at least one fastening leg 25 and one deformation leg 26 which, in a bent manner, starts out from the fastening leg 25. Particularly FIGS. 2 and 5 illustrate that the deformation element 23, as an open profile, is provided, in particular, with a C-shaped or U-shaped cross-section. In order to be able to fasten the deformation element 23 on the interior surface 24, the fastening leg 25 has one or more fastening openings 27, one or more fastening nose(s) 28, which start(s) out from the interior surface 24, reaching through the fastening openings 27. The fastening nose 28 preferably starts out from a platform 29 constructed on the interior surface 24. The platform 29 supports the deformation element 23 in a spaced manner while forming a gap 30. The fastening nose 28, which may be made from a plastic material, is deformed for a secure holding of the deformation element 23 on the interior surface (24), for example, by the effect of heat generated by welding, so that the deformed fastening nose (not shown) reaches over an edge 31 of the corresponding fastening opening 27.

As a result of the further development of the deformation element 23 as a hollow profile, the deformation leg 26 can be deformed in an energy-absorbing manner, when the width W of the intermediate space 12 is reduced by a force FA. Thus, the supporting element 13 yields and the interior-covering part 11 is displaced in the direction of the body shell element 3. In this case, the deformation leg 26 is supported on the interior side 10 of the body shell element 3, is deformed, and in the process moves in the direction of the fastening leg 25.

FIG. 5 illustrates that the deformation leg 26, particularly via its free end 32, in the undeformed condition ZA, is arranged at a distance AB from the interior side 10 of the body shell element 3. The deformation leg 26 is therefore constructed in a free-standing manner and is connected only by way of the fastening leg 25 with the interior-covering part 11. In order to not influence or only insignificantly influence the deformation behavior of the deformation element for the energy absorption, the deformation behavior of the supporting element 13 is coordinated with the deformation behavior of the deformation element 23. This can be achieved in that the supporting element 13 is constructed such that, when acted upon by the force FA, it fails or deforms such that the interior-covering part 11 is supported on the body shell element 3 mainly by the deformation element 23. According to a special embodiment, the supporting element 13, implemented as the fastening dome 17 and coordinated, has at least one side wall 18 which is weakened with respect to the other side walls 18. This can be implemented, for example, by a weakening opening 33 made in the side wall 18 or by a completely removed side wall 18.

Several webs 34 are constructed as elevations on the interior surface 24 of the interior-covering part 11. The webs 34 may extend in the direction of the longitudinal dimension LE of the interior-covering part 11 and/or transversely thereto, and may be connected at their interfaces ST with the other webs 34. The webs 34 therefore form a raised structure 35 which is arranged on the interior surface 24 and is used particularly for the reinforcement of the interior-covering part 11. The webs 34 of the structure 35 may—as illustrated in FIG. 5—have different heights and may, in particular, be higher than the platform 29, on which the fastening leg 25 is supported. So that the fastening leg 25 does not rest on the webs 34. It has several recesses 36 which may extend into the deformation leg 26 such that the deformation element virtually has a comb structure 37 which is clearly illustrated in FIG. 3. The webs 34 of the structure 35 are arranged in the recesses 36.

One deformation element 23 is in each case fastened to the interior-covering part 11 beside the supporting element 13. These two deformation elements 23 are arranged in series but at a distance from one another, so that a clearance 38 is formed in which the supporting element 13 is arranged. The two deformation elements 23 are coupled to one another by way of a connecting lug 39, so that they can jointly be mounted on the interior-covering part 11. The connecting lug 39 extends around the supporting element 13 and connects particularly the two fastening legs 25 of the two deformation elements 23. In addition, the connecting lug—as illustrated in FIG. 3—is constructed as an arch which spans the web 34 starting out from the supporting element 13. The two deformation elements 23 and the connecting lug 39 are preferably made of one piece.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle comprising:
a body shell element;
an interior-covering part for the body shell element;
an energy-absorbing deformation element arranged between the body shell element and the interior covering part, which deformation element is constructed as a sheet metal part in the shape of an elongated hollow open profile of C-shape or U-shape cross-section, wherein the deformation element includes at least one fastening leg and at least one deformation leg having free ends extending in the same direction, which fastening leg is connected with the interior-covering part and which deformation leg starts out from the fastening leg and faces the body shell element; and
a deformable supporting element connecting the interior-covering part to the body shell element, wherein the deformation characteristics of the deformable supporting element take into consideration the deformation characteristics of the deformation element, and the deformation leg is arranged at a distance from the body shell element.

2. The motor vehicle according to claim 1, wherein an interior surface, facing the fastening leg, of the interior covering part comprises several webs.

3. The motor vehicle according to claim 2, wherein at least the fastening leg has several recesses in which the webs are arranged.

4. The motor vehicle according to claim 1, further comprising another deformation element, wherein the two deformation elements are arranged in series on the interior-covering part but at a distance with respect to one another, and wherein the supporting element is arranged between the two deformation elements.

5. The motor vehicle according to claim 4, further comprising a connecting lug, wherein the two deformation elements are mutually connected by the connecting lug, and wherein the connecting lug extends past the supporting element.

6. The motor vehicle according to claim 5, wherein an interior surface, facing the fastening leg, of the interior covering part comprises several webs, and wherein the connecting lug spans one of webs.

7. The motor vehicle according to claim 1, further comprising a fastening nose on an interior surface of the interior-covering part, wherein the fastening leg has at least one fastening opening, and wherein the fastening nose extends through the fastening opening.

8. The motor vehicle according to claim 7, wherein the fastening nose reaches over an edge of the fastening opening.

9. The motor vehicle according to claim 1, wherein the supporting element includes a fastening dome whose roof is supported on the body shell element.

10. The motor vehicle according to claim 9, wherein the fastening dome has a weakening opening in at least one side wall.

11. The motor vehicle according to claim 9, further comprising a holding element on the interior covering part, wherein the holding element has a reach-behind element and is inserted in the roof of the fastening dome, which reach-behind element is inserted into the body shell element.

12. The motor vehicle according to claim 1, wherein the body shell element includes a pillar or a roof member.

* * * * *